W. M. PEABODY.
AUTOMOBILE TIRE.
APPLICATION FILED MAR. 5, 1914.
1,149,782.
Patented Aug. 10, 1915.
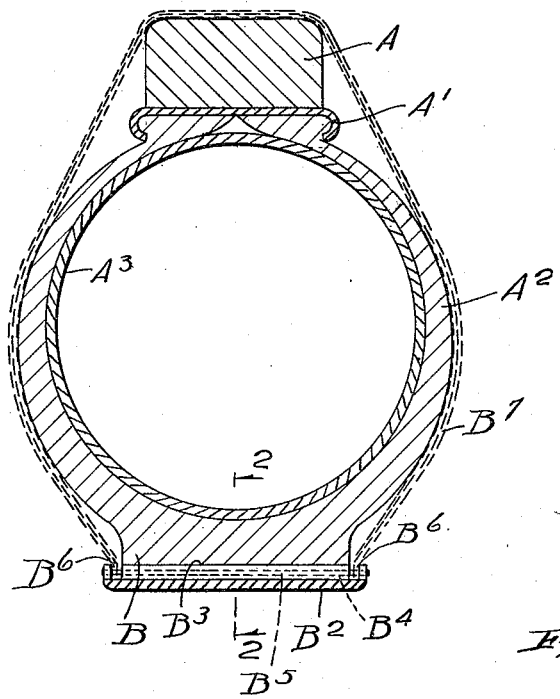
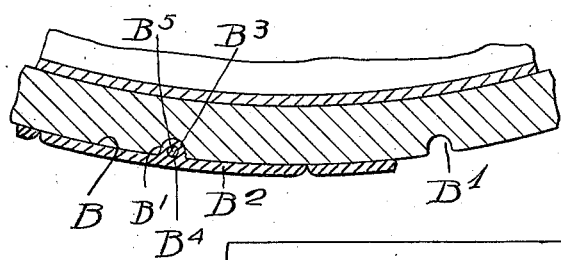
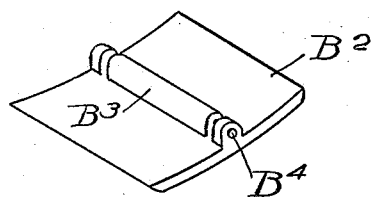
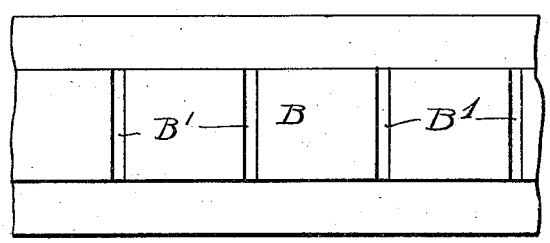
Witnesses:
Inventor
Warren M. Peabody,
by Parker & Carter
his Atty's

UNITED STATES PATENT OFFICE.

WARREN M. PEABODY, OF CHICAGO, ILLINOIS.

AUTOMOBILE-TIRE.

1,149,782. Specification of Letters Patent. Patented Aug. 10, 1915.

Application filed March 5, 1914. Serial No. 822,549.

*To all whom it may concern:*

Be it known that I, WARREN M. PEABODY, a citizen of the United States, residing at Chicago, in the county of Cook and State of Illinois, have invented a certain new and useful Improvement in Automobile-Tires, of which the following is a specification.

My invention relates to improvements in armor tread for pneumatic tires and is illustrated more or less diagrammatically in one form in the accompanying drawings, wherein—

Figure 1 is a section through a tire; Fig. 2 is a section along line 2—2 of Fig. 1; Fig. 3 is a perspective detail of one of the tread members; and Fig. 4 is a plan view of the tire without the tread member applied.

Like parts are indicated by the same letter throughout the several figures.

A is a wheel felly having a clencher rim $A^1$.

$A^2$ is the casing held within the clencher rim $A^1$ in the usual manner.

$A^3$ is a pneumatic tube contained within the casing $A^2$.

B is a flat faced tread projection arranged peripherally about the casing $A^2$ and grooved at $B^1$.

$B^2$ is a curved metallic tread plate adapted to rest upon the flat faced tread section B provided with the inwardly extending lug $B^3$ to engage the grooves $B^1$. This lug is apertured as at $B^4$ to engage and hold the pin or rivet $B^5$ which passes through the lug and engages the ends $B^6$ of the tie chain $B^7$, as indicated in Figs. 1 and 3, and is provided with slots $B^8$, $B^8$ for receiving the ends $B^6$, $B^6$ of the holding chain $B^7$.

It will be evident that, while I have shown in my drawings an operative device, still many changes might be made in size, shape and arrangement of parts without departing from the spirit of my invention. I wish, therefore, that my drawings be regarded as in a sense diagrammatic.

The use and operation of my invention are as follows: The tire is placed on the rim in the usual manner but either entirely deflated or else filled to a very light pressure. The tread plates are then positioned with the lugs thereon engaging the grooves in the tread, as shown in Fig. 2. The holding chains are then passed around over the felly and the holding pins are inserted. These chains may be easily drawn sufficiently tight on the deflated tire so that when pumped up they will be absolutely rigid. This will hold the tread members firmly on the tire tread, permitting a minimum of displacement and give. As the wheel rotates, of course, these tread members will be displaced in a similar manner to the displacement of the tread of the tire itself, and no harm will be done. Thus the tire will be protected by these tread members, and abrasion of the tire tread will be decreased if not entirely obviated as will the possibility of punctures, since practically all punctures are caused by the entrance of a puncturing element through the defective tread surface of the tire.

I claim:

A protecting tread member for automobile tires and the like comprising a curved shield, an inwardly projecting centrally located lug on said shield, said lug being apertured, slots through said lug intersecting said aperture, a pin located in said aperture passing through said slots, and a holding device in engagement with said pin and located partially in said slots for holding it in position.

In testimony whereof, I affix my signature in the presence of two witnesses this 16th day of February 1914.

WARREN M. PEABODY.

Witnesses:
 MINNIE M. LINDENAU,
 BESSIE S. RICE.

Copies of this patent may be obtained for five cents each, by addressing the "Commissioner of Patents, Washington, D. C."